July 26, 1932.  W. J. LEIDY ET AL  1,868,667
COIL WINDING MACHINE
Filed Jan. 5, 1931  6 Sheets-Sheet 1

Fig. 1.

Inventors
Wilmer J. Leidy,
Nick Knuth.
by Charles Wills Attys.

Patented July 26, 1932

1,868,667

UNITED STATES PATENT OFFICE

WILMER J. LEIDY AND NICK KNUTH, OF CHICAGO, ILLINOIS, ASSIGNORS TO CHICAGO TRANSFORMER CORPORATION, OF CHICAGO, ILLINOIS, A CORPORATION OF ILLINOIS

COIL WINDING MACHINE

Application filed January 5, 1931. Serial No. 506,518.

This invention relates to a coil winding machine and particularly to one for winding coils for electrical apparatus, such, for instance, as radio transformers and similar articles.

The machine of the present invention contemplates one whereby a plurality of coils may be wound at the same time, which coils are arranged in endwise spaced relation which when finished are severed.

An object of the present invention is to provide a machine for winding coils, circular as well as polysided, on a rotating support or mandrel to produce coils having the turns thereof evenly wound and smooth.

Another object of the invention is to provide a coil winding machine whereby the same drive may be used to wind wires of different gauges in the same length of coil or to wind wires of variable gauges in different lengths of coils.

Another object of the invention is to provide a coil winding machine with a mandrel or bobbin support wherein a plurality of coils may be wound at one time in endwise spaced relation together with means for laying on the wires to produce the spaced coils, and wherein the coils may be coiled snugly and regularly together with provision for effecting variation in spacing of the coils, and the like.

A further object of the invention is to produce a wire coiling machine provided with simple, reliable and readily adjustable devices for automatically reversing the guide mechanism and with means for automatically varying the rate of the rotation of the winding devices and the rate of movement of the traverse mechanism.

A still further object of the invention contemplates the provision of simple reverse mechanism for the traverse guide of the coil winding machine wherein the range of movement may be quickly altered without making any changes of parts of the reverse mechanism.

A still further object of the invention is to provide tension means for coil winding machines.

Another and yet further object of the invention is to provide tension means for coil winding machines of such nature that the wire as it passes from the reels to the winding spindle or mandrel is subjected to uniform tension at all times.

Another and yet further object of the invention is to provide a coil winding machine of the type wherein a plurality of coils are wound at one time on a mandrel with oscillating knives for severing the coils while still on the mandrel, thus doing away with a separate cutting operation.

The above, other and further objects of the invention will be apparent from the following description, accompanying drawings and appended claims.

Embodiments of the present invention are illustrated in the accompanying drawings and the views thereof are as follows.

The drawings will now be explained.

A frame designated generally at A is supported on a table bench or like structure for convenient operation in coil winding. The frame is so mounted that an operator standing on the floor may comfortably operate the same without unnecessary bending of the body.

The frame A as illustrated includes small side members 1 fastened to a transverse bottom member 2 which is illustrated as an inverted channel. Front uprights 3, rear uprights 4, the latter preferably inclined rearwardly, which latter are connected by members 5 to the front uprights 3. Rear uprights 4 carry cross straps 6 arranged one above another which straps are provided at intervals of the length thereof with reel supports 7 every support consisting of a plate and an upstanding pin 8 over which an end of the reel is placed as may be observed. The reels B in the present instance are illustrated as placed on one end over the supports 7 with the axes thereof slightly inclined to the vertical.

There are many of such reels supported in a frame of the present type of machine.

A threaded bar 9 is supported in the upper ends of the front uprights 3 and extends across the machine. A plurality of individual grooved wheels 10 are supported on the bar 9 by hangers 11 which are adjusted along the length of the bar 9 by means of nuts 12 arranged one on each side of a hanger. There are many of these wheels 10, there being one for every one of the reels B in the machine.

A drive-shaft 13 is journaled in an end plate 1 and in an intermediate plate 14 suitably secured to the framework A. A hub 15 is rotatable on the shaft 13 and carries in the present instance two pulleys 16 and 17 of different diameters. A hand wheel 18 forming a part of hub 19 is also rotatable on the shaft 13. The hub 15 is clutched to the wheel 18 and this hub 19 for driving the wheel from the shaft. The hand wheel 18 may be grasped by the operator and immediately declutched, allowing the pulleys 16 and 17 to rotate without actuating the winding spindle or mandrel as will be more fully explained.

The hub 19 is provided with a stub end 20 which projects through the intermediate plate 14 and in the present instance is provided with spaced jaws 21 for receiving therebetween one end of a mandrel or winding spindle 22.

The other end frame member 1 is provided with a slide 23 operable by a handle 24 outwardly of the frame member 1 for movably receiving the other end of the mandrel 22. Spring or other suitable means, not shown, normally retains the slide 23 inwardly of its end frame member for engagement with the end of the mandrel 22 for rotatably connecting the same with a driving shaft at the opposite side of the machine.

The mandrel 22 in the present instance is illustrated as polygonal in cross-section being substantially rectangular and provided at intervals in its length with peripheral grooves 25. The mandrel 22 of course may be of any other cross-sectional shape such as circular, square, rectangular, hexagonal or what not as desired without in any manner affecting the operation of the machine.

The mandrel 22 is readily removable for the application thereto of a core C on which the coils are wound and for the removal of the core when the winding operation is completed. Also the mandrel may be removed to be replaced by one of different size or shape in accordance with the winding conditions which arise in the manufacture of coils in such a machine.

A shaft 26 is suitably supported in the machine parallel to and preferably above the mandrel 22. A plurality of collars 27 are secured to the shaft 26 by set screws 28, which collars are provided with knives 29. The collars 27 are spaced on the shaft 26 so that a knife registers with a peripheral groove 25 in the mandrel 22. A handle 30 is secured to the shaft 26 for rocking the shaft to raise the knives 29 against the core on the mandrel 22 and thus sever the core to separate the coils as wound on the mandrel. Normally the knives lie away from the mandrel 22 as illustrated clearly in Fig. 7.

Figure 1:
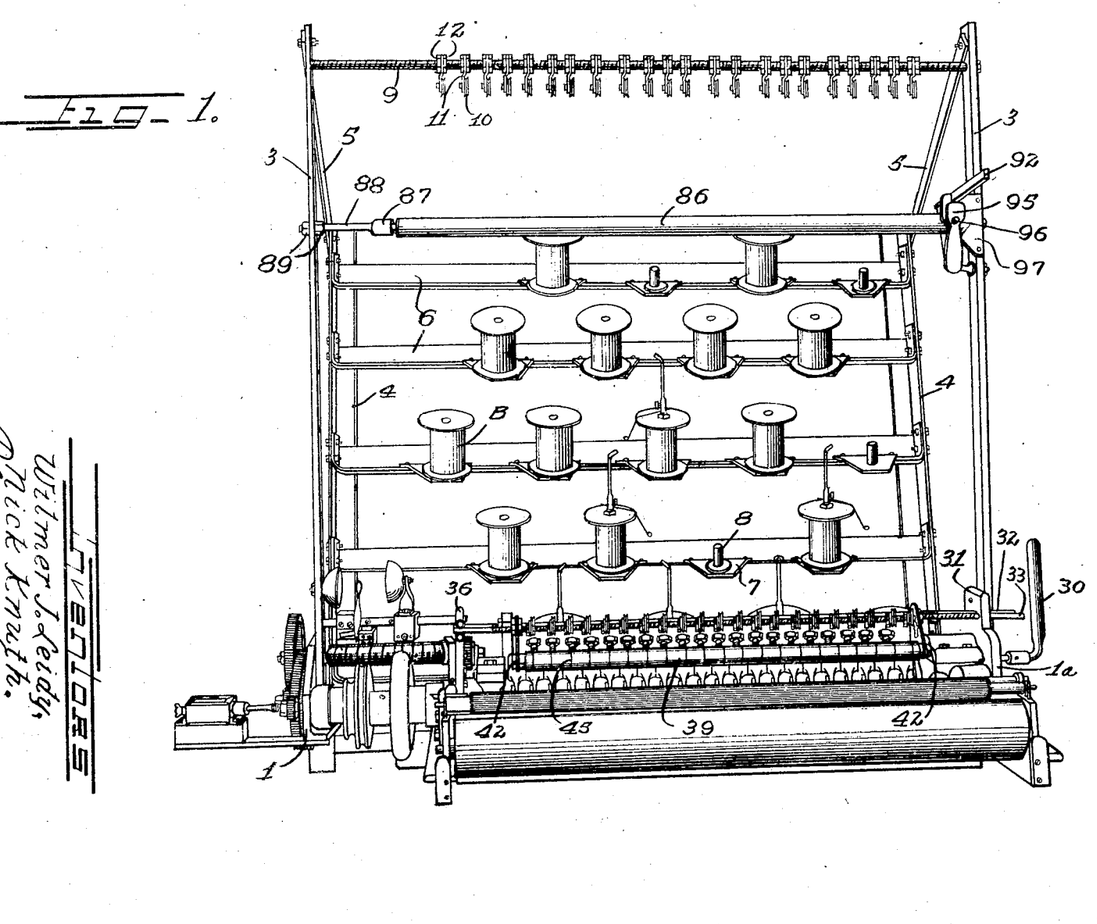
Figure 1 is a front elevational view of a coil-winding machine embodying the present invention with certain parts omitted and other parts partially shown, showing the arrangement and relation of the various elements of the machine.
Figure 4:
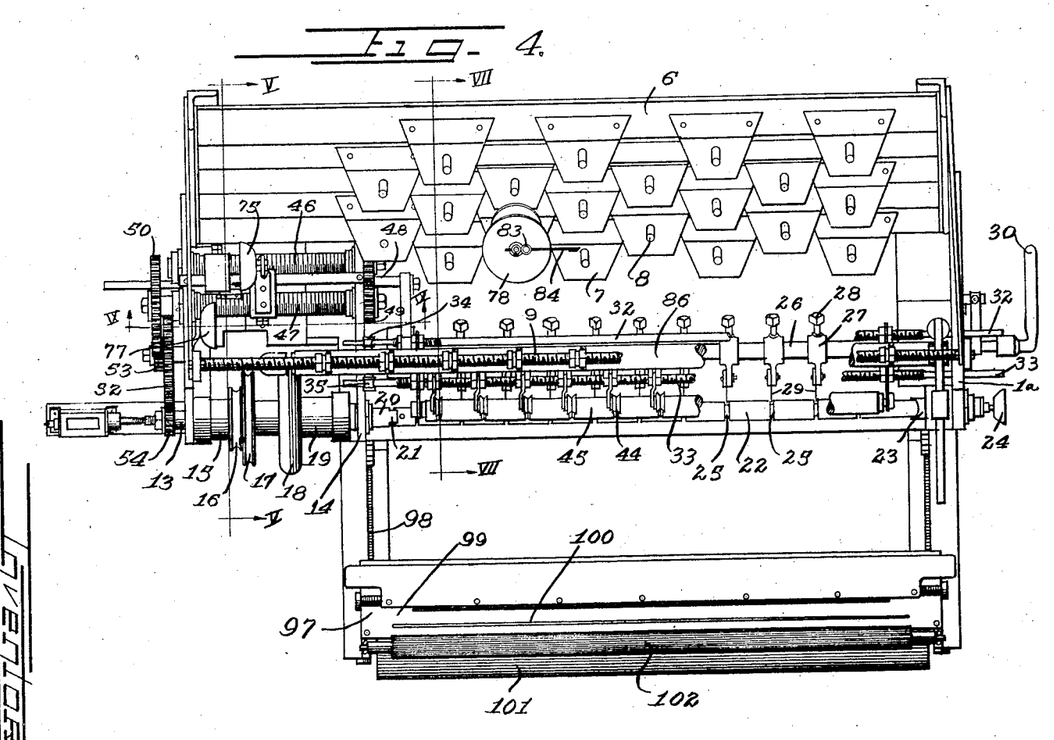
Figure 4 is a top plan view of the machine with parts broken away showing the details of construction.

The end plate 1—a which is part of the right-hand portion of the machine as illustrated in Figs. 1 and 4, is provided with an upstanding extension 31 provided with two holes through which slide rods 32 and 33. The other ends of the rods 32 and 33 are supported in pairs of rollers 34 and 35 for to and fro movement or axial movement of the rods.

The rollers 34 and 35 are carried in an upwardly projecting portion 36 of the intermediate frame member 14.

Figures 7, 8:
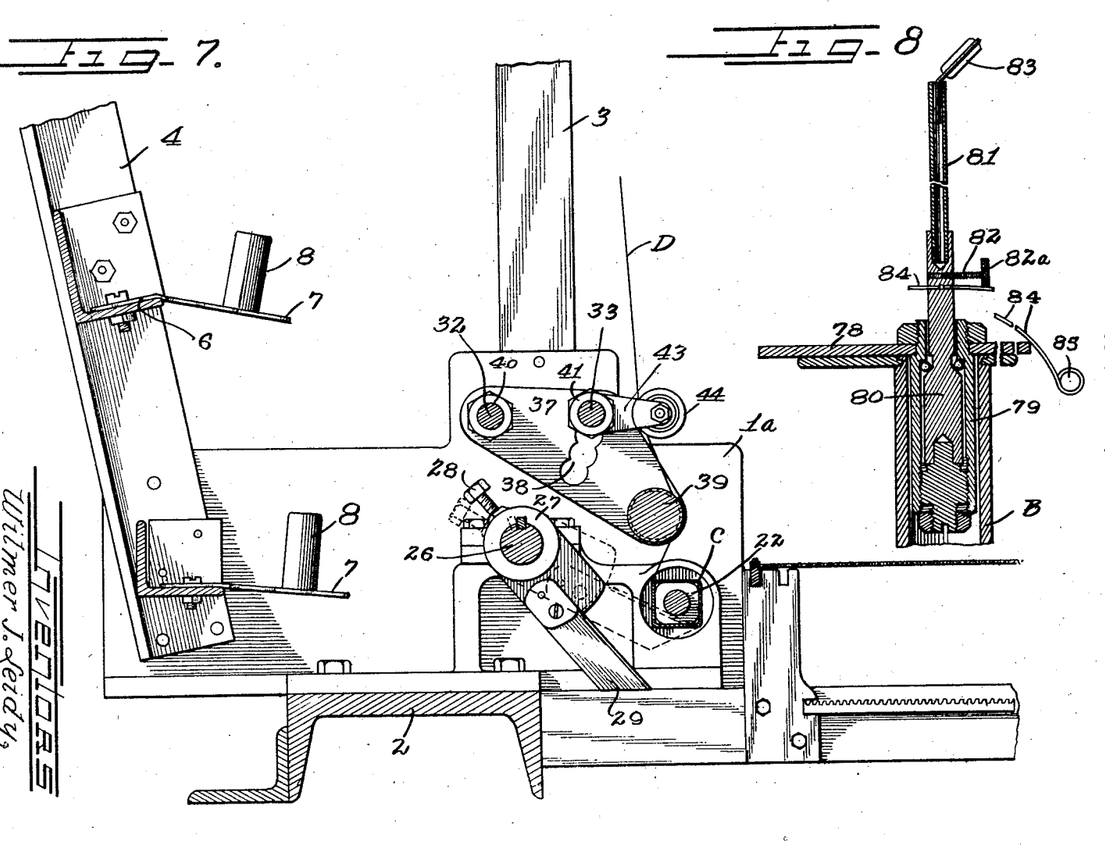
Figure 7 is an enlarged sectional view taken substantially in the plane of line VII—VII of Fig. 4.
Figure 8 is an enlarged fragmental sectional view through tensioning means as applied to a wire reel.

A plate 37 substantially triangular in elevation as may be observed in Figure 7 is provided with a hole at one end for receiving the rod 32, an arcuate slot 38 near its middle for receiving the rod 33 and at its other end is provided with an opening which receives one end of a roller 39. A similar plate is attached to the rods 32 and 33 near the upstanding projection 36 of the frame 14. The plates 37 and the rods 32 and 33 constitute a carriage or traveler mechanism forming a laying on means for the wire as the same is guided from the reels B to the mandrel 22 for winding into coils as will be more fully explained.

The plates 37 are secured in position on the rods 32 and 33 by nuts 40 and 41 respectively there being one of these nuts on each side of the plate 37 at either end of the carriage.

The roller 39 is supported in the plates 37 by bearings 42.

The front rod 33 is threaded throughout its length and is provided at intervals at its length with a plurality of brackets 43, which brackets are secured in axial position along the rod by means of lock nuts engaging each side of the brackets. The brackets 43 carry individual rollers 44 which are grooved and over which the wire is trained from the reels to the mandrel 22.

The plates 37 are angularly adjustable about the rod 32 as a center within the limits of the arcuate slot 38 being secured in adjusted position by the lock nuts cooperating with these plates and the rod 33.

The brackets 43 are angularly adjustable about the rod 33 so that the angular movement of the plate 37 and of the bracket 43 enables the positioning of the rollers 44 and the roller bar 39 in any of several adjustable positions depending on the character of wire being wound, the tension desired, and also having in mind efficient operation of the machine.

The roller bar 39 is illustrated as provided with a plurality of shallow peripheral grooves 45 in which the wires are trained as the same pass downwardly from the individual rollers 44.

It is of course understood that when the roller bar 39 is used, rollers 44 are spaced to coincide with the grooves 45 in the bar. It is also understood that instead of using the bar 39, a plurality of rollers similar to rollers 44 may be substituted if desired and axially adjusted to coincide with the rollers 44 on the bar 33.

It has been found that utilizing the roller bar 39 grooved as described makes adjustment of the rollers 44 easier as there is but this one set of rollers to adjust axially of the rod 33 so that a machine once equipped with a roller bar 39 and the rollers 44 adjusted accordingly is set to wind coils of uniform length.

The carriage just described, that is, the instrumentality including the plate 37, the bars 32 and 33, the supported rollers 44 and roller bar 39 constitutes a traverse mechanism for guiding the wires from the reels in to and fro manner along the mandrel 22 for evenly distributing the wire over the core C on the mandrel 22, thus providing layers of uniform character which are smooth and even. The tightness of the coils formed on a machine of this character depends upon the tension imparted to the wires and also on the characteristics of the wire being wound.

The traverse mechanism or wire guide just described is moved parallel to the mandrel or spindle 22 and reversed at its end of travel in either direction for travel in the opposite direction, such movement continuing until coils of requisite numbers of layers are formed.

The mechanism utilized for operating the traverse mechanism described in the present instance consists of two parallel screws 46 and 47 supported at the inner ends in intermediate plate 14 and at the outer ends in the end plate 1. The screws are provided at their inner ends with gears 48 and 49 which are in mesh at all times, thus driving the screws in opposite directions. The screw 47 is extended at its outer end to receive a gear 50 forming a gear in a gear train between the drive shaft 13 and the reversing screws 46 and 47.

A stub-shaft 51 is supported in the end frame member 1 and carries two gears 52 and 53. The gear 52 is a large one meshing with gear 54 on the drive shaft 13 whereas the gear 53 is a small one meshing with the gear 50 on the screw 47.

It will be observed that the reversing screws 46 and 47 are actuated from the drive shaft and it is also to be observed that by changing the sizes of gears and varying the numbers of teeth, the screws 46 and 47 may be driven at different rates of speed from the drive shaft 15 without changing the rate of speed of the drive shaft 13 and its associated mandrel or spindle 22.

It is desirable at times to vary the rate of travel of the traverse mechanism, depending on the size of wire being wound and it is accomplished in the present instance by interchangeable gears interposed between the drive shaft 13 and the screw 47.

Figure 9:
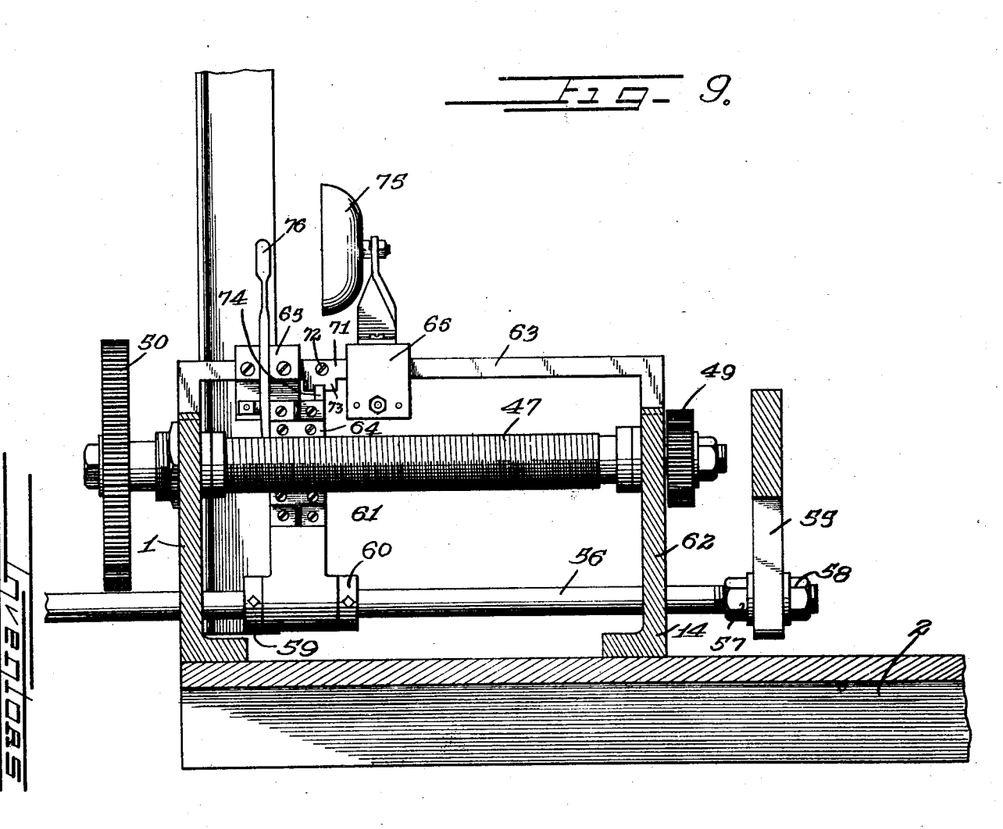
Figure 9 is an enlarged sectional view taken substantially in the plane of line IX—IX of Fig. 4.

A part of the traverse mechanism or carriage includes a plate 55 which extends below the rods 32 and 33 which plate has fastened to it a rod 56 extending to the left of the carriage as viewed in Figs. 1, 4 and 9. The rod is fastened in the plate 55 by lock nuts 57 and 58.

The rod 56 is provided outwardly from the plate 55 with spaced collars 59 and 60 between which is carried an oscillating arm 61 extending upwardly from the rod 56. The intermediate frame member 14 has a portion 62 thereof through which extends one end of the oscillating rod 56.

A bar 63 extends from end plate 1 to part 62 and is removably attached to the box in any suitable manner. The upper end of the oscillating arm 61 carries a double faced nut 64 arranged for alternate engagement with the screws 46 and 47, being switched from one screw to the other by switching means to be presently explained.

The traverse mechanism is given its forward and back or endwise movement by means of the nut 64 alternately engaging the screws 46 and 47 and thus through the medium of the oscillating arm 61 and extension rod 56 imparts movement to the carriage. The extent of movement of the carriage is determined by stops 65 and 66 which are adjustably positioned on the bar 63.

Figures 5, 6:
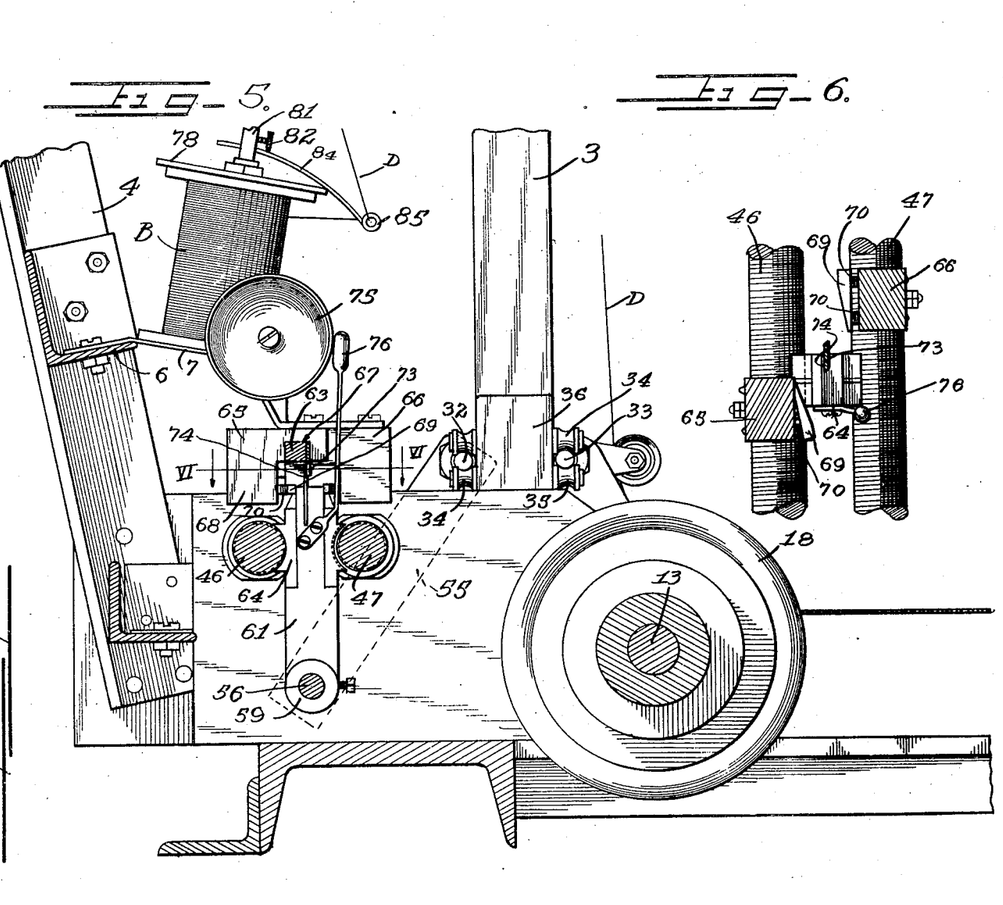
Figure 5 is an enlarged sectional view taken substantially in the plane of line V—V of Fig. 4.
Figure 6 is an enlarged sectional view taken substantially in the plane of line VI—VI of Fig. 5.

Figure 5 illustrates the stop 65 as being substantially L-shaped with a groove 67 therein for fitting over the bar 63 and a depending portion 68 extending below the bar 63. The stop 66 is made in a similar manner but reversed as to position.

The inner face of the depending portion 68 carries a wedge 69 which is normally maintained in outward position by springs 70. There are two such springs 70 illustrated, but it is understood that one spring may be utilized, or if desired, a flat bent leaf-spring used in place of the wedge 69 and the springs 70. The wedge 69 is engaged by the nut 64 as it nears its limit of travel in the direction to which it is being moved by one of the screws so that when the nut is freed from engagement with its screw, the springs become effective to switch the nut into engagement with the opposite screw for travel in the opposite direction.

The bar 63 is provided also with a plate 71 fastened to the bar by a screw 72 which plate has a depending portion 73. The nut 64 is provided with an upwardly extending finger 74 which engages the portion 73 of the plate 71. The plate 71 and its depending portion 73 constitutes the guide for determining the length of travel of the carriage in either direction. The finger 74 of the nut engages one side of the portion 73 as the nut is moved in one direction and engages the other side of the portion 73 as the nut is moved in the opposite direction. The portion 73 and the finger 74 serve to retain the nut in engagement with whichever screw with which it is in mesh at the moment.

It will be observed, therefore, that the nut 64 is given reciprocal movement by alternate engagement with the screws 46 and 47, the length of such engagement being determined by the length of the depending portion 73 of the plate 71. This plate may be replaced by another having a depending portion of greater or less length, depending on the length of the coils to be wound. The stops 65 and 66 are adjusted along the bar 63 in accordance with the length of the depending portion 73 of the guide plate, so that the wedges 69 of the stop may be effective to switch the nut from one screw to the other as soon as the finger 74 of the nut is released from sliding engagement with the plate 71.

A bell striker 76 is attached to the nut 64. A bell 75 is carried by the stop 66. A similar bell 77 is secured to the frame of the machine. The striker moves with the nut as it is switched from screw to screw and in so moving strikes the adjacent bell to sound an alarm when the nut reaches the other limit of travel.

The successful winding of coils on a machine of this character depends on winding the wire under proper tension having in mind the character of the wire, such as the size and the like, and also the size of coils.

It is essential that tension be maintained as nearly uniform as possible so that when polysided coils are being wound, the tension means will be effective to maintain tension constant, thus assuring an evenly wound polysided coil. This is true also of a circular coil or of any other form, namely that the tension must be uniform in order to successfully wind a coil, no matter what its cross-section may be.

Illustrated herein are two means for imparting tension to the wire as the same passes from the reels B to the mandrel 22.

There is an individual tension means for every reel of such character that tension is placed on the wire as it leaves the reel. The reel tension means also aids in unwinding the wire without kinking, leading the wire from the reel tangentially, thus reducing breakage to a minimum.

Reels are illustrated as being set on an end with the axes inclined slightly to the vertical. The tension means used with the individual reels consists of a circular plate 78 having a cylindrical portion 79 for entering the spool of the reel from the upper end. The portion 79 is hollow and carries an upstanding rotatable bar 80 which in turn carries a rod 81, this rod 81 being let into an opening in the upper end of bar 80. The rod 81 is provided at its free end with a leader 83 so that the rod 81 and its leader 83 appear very much like the tip of a fishing rod. A screw 82 is threaded into the bar 80 above the arm 84 with the head 82—a against the arm. The purpose of the screw is to regulate frictional engagement of the arm 84 with plate 78. By moving the screw inwardly of the bar 80 the tension is lessened and by moving it outwardly, the tension is increased.

The leader 83, in fact, is provided with a guide such as agate which is smooth and causes no harm to the wire. A spring arm 84 having a leader 85 at its free end is fastened in the sleeve 80 substantially perpendicularly to the rod 81 and is bent so that the leader 85 thereof lies below the plate 78 when in position on a reel B. The leader 85 likewise may be provided with agate or similar lining so as not to damage the wire. The wire is led from the spool first through the leader 85 and the arm 84, thence upwardly to the leader 83 and the rod 81, thence upwardly over one of the rollers 10.

The bar 80 and its supported rod 81 and arm 84 rotate as the mandrel 22 is rotated to unwind the wire from the reel. This then swings the arm 84 in a circular path leading the wire from the spool tangentially. The pull of the wire as it is unwound from the reel B tends to raise the leader end of the arm 84 thus tending to reduce frictional engagement or drag of the arm 84 and plate 78. Adjustment of the screw 82 is made to compensate for such tendency and thus proper tension is placed on the wire as it leaves reel B.

Another tension means is included in the present machine and includes a roller 86 extending across the front of the machine and about which roller one turn of every wire strand passes. The strands are trained downwardly underneath the individual rollers 44 and over the bar 39, thence to the core C on the mandrel 22 which mandrel is rotated in the direction indicated by the arrow in Fig. 3; that is, in counter-clockwise direction in this figure for winding the wire strands onto the core.

The rod 86 is supported at one end in a cup 87 carried at the end of a bar 88 fastened in one of the front uprights 3 by means of nuts 89, while the other end of the bar 86 is removably supported in the other front uprights 3.

A bracket 90 is fastened to this other front upright 3 which bracket extends upwardly and has pivoted to it at 91 one end of a lever 92, the other end of which extends forwardly and supports a sliding weight 93. The arm 92 is provided with a shoe 94 which engages the roller 86 and serves as a brake to retard rotation of the roller. The pressure of the shoe 94 against the roller 86 may be varied by sliding the weight 93 inwardly or outwardly along the lever 92 as desired. A cam 95 is pivoted at 96 to the bracket 97 which bracket underlies the lever 92 and which cam may be turned about its pivot to raise the lever 92 sufficiently so that the shoe 94 thereof will be free of engagement with the roller 86 which is desirable when wire is being threaded.

Figures 2, 3:
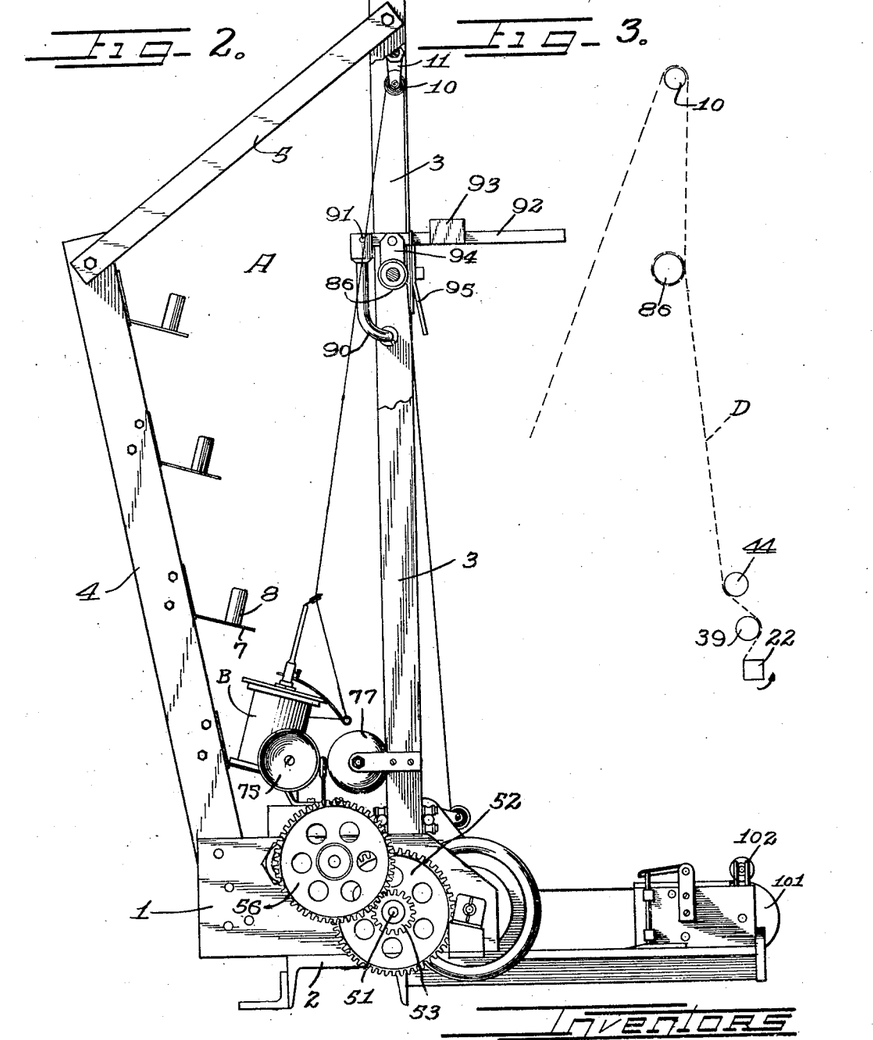
Figure 2 is an end view of the machine illustrated in Fig. 1 looking at the left-hand end of the same.
Figure 3 is a diagrammatic view of the manner of threading the wire from the reels to the mandrel or rotating spindle of the present machine.

Fig. 3 illustrates diagrammatically a strand of wire leading from one of the reels B upwardly over a roller 10 hung from the top bar 9 thence downwardly where it is given one turn about roller 86 thence downwardly underneath the upper roller 44 of the traverse mechanism then about the roller bar 39 thence to the spindle or mandrel 22 where it is suitably fastened for winding when the spindle is rotated in counterclockwise direction as viewed in Fig. 3. Adjusting the roller 44 with respect to the roller bar 39 varies the peripheral engagement of the wire strands with these rollers. It also varies the angularity of the wire as it passes from the roller bar 39 to the mandrel 22. This adjustment is made to depend on the character of wire being wound, and the amount of tension desired to be utilized.

It has been found in practice that the roller bar 86 is very effective to supply even tension to a plurality of strands of wire led to the mandrel 22 for winding a plurality of coils at the same time. This bar tends to put more tension in a strand which for some reason is larger than usual and relieve tension in a strand which is smaller than usual, so that the average tension placed on the several strands of wire passing over the tension bar 86 is made uniform with the consequent improvement in the winding of the coils on the mandrel 22.

Tension may be adjusted in the reel tension means by moving the screw 82 inwardly or outwardly in the bar 80 so that the degree of frictional engagement with the margin of the plate 78 can be varied.

It will be observed, therefore, that tension means have been provided of such character as to be readily adjustable to accommodate wires of different characteristics and at the same time efficient to impart sufficient tension to the wire during the winding operation to produce coils of uniform character and evenness of layers.

Machines embodying the present invention have been in use for some time and it has been found that coils wound on these machines are of greater uniformity throughout than coils wound in other manners and in other machines which is believed due to the manner of imparting tension to the wires. These machines have reduced breakage to a minimum as the tension is evenly applied and may be adjusted to a fineness which will produce the exact tension necessary under certain conditions of use.

It has been found desirable when a machine is set up to run many coils of approximately the same size to employ the roller bar 39 in place of a plurality of similar rollers 44. Where the bar 39 is utilized then the individual rollers 44 are spaced axially of the rod 33 to bring into register the grooves in the rollers 44 with the grooves 45 in the roller bar 39.

The roller bar 39 as before stated may be supplanted by individual rollers if desired.

The operation of the machine is as follows:

Reels B filled with wire are placed on the reel support 7 and every reel is supplied with plate 78 and the tension members 81 and 84. The wire is threaded first of all through the leader 85 and the arm 84, then upwardly to the leader 83 on the rod 81 upwardly over the roller 10 then downwardly where one turn is made about the roller 86 downwardly underneath the rollers 84 then trained over the roller bar 39 and then led to the mandrel where the ends of the wire are fastened for winding when rotation is imparted to the mandrel.

If a mandrel 22 provided with peripherial grooves 25 is utilized then the distance between the grooves is determined by the maximum length of coil to be wound. The core C is applied to the mandrel 22 when the same is removed from the driving shaft connections and are placed with the core thereon whereupon the ends of the wire strands are fastened in any suitable manner.

The to and fro movement of the traverse mechanism is then set by adjusting the stops 65 and 66 of the reverse mechanism and also inserting a guide plate 71 of proper length so that the carriage may be moved endwise the proper distance, stops 65 and 66 being set to switch the nut 64 from screw to screw whenever the nut reaches its limit of travel as determined by the plate 71. It will be observed that the coil winding machine of the present invention is one which lends itself very readily to quick hook-up and adjustment and one in which the various parts may be interchanged if desired.

The roller bar 86 is provided with proper amount of tension by means of the weight 93 being slid along the lever 92 to proper position. In the event that no tension is desired on this bar then the lever 92 will be raised so as to free the shoe 94 from engagement with the bar 86, the raising being accomplished by actuation of the cam 95.

The illustrated form of machine is provided with means for feeding paper to insulate one layer of windings from the next. This, however, forms no part of the present invention and will not be fully described.

Suffice it to say that a carriage 97 is movable toward and away from the machine along racks 98. The carriage 97 has a plate 99 slotted at 100 whereby the operator may insert a knife and cut off paper of desired lengths. The paper is fed between the lower roller 101 and upper friction roller 102 which rollers are suitably mounted in the carriage. The operator advances paper so that the leading edge thereof is adjacent the mandrel 22 and severs this length by inserting a knife in the slot 100, then as soon as the signal is sounded which occurs when the reverse mechanism reaches its limit of travel in one direction. The carriage is moved forwardly so that the leading edge of this cut-off piece of paper is inserted between the winding on the mandrel and the wire trained down from the carriage so that the sheet of paper is then wound about the mandrel between the layer formed and the layer about to be formed. This operation is repeated as many times as necessary to properly insulate the various layers of windings of the coils.

When the core C on the mandrel has been wound to the desired amount, the machine is stopped, the wires are then cut from the mandrel with the loose ends properly secured to the machine and then the handle 30 is actuated to bring the knives 29 up against the core C. The machine is then placed in operation and the mandrel rotated while the operator bears on the handle 30 to urge the knives 29 against the core to cut the same into individual coils of desired length. When this has been completed, the machine is stopped, the end 23 is pulled out by means of the handle 24 whereupon the mandrel is removed from the machine and the severed coils taken off endwise and a new core 3 applied for the next operation.

It is possible for the operator to stop rotation of the mandrel at any time by grasping the hand wheel 18 and stopping the same. This stops the rotation of the mandrel as the drive wheels 16 and 17 are attached to the mandrel through clutch mechanism co-operating with the hand wheel 18 and its hub 19. The moment pressure is released from the hand wheel 18 the clutch becomes effective to drive the mandrel.

The invention has been described herein more or less precisely as to details, yet it is to be understood that the invention is not limited thereby and changes may be made in the arrangement and proportion of parts without departing from the spirit and scope of the invention.

The invention is claimed as follows:

1. A coil winding machine including a winding spindle and a wire guide endwise movable along said spindle, two series of guide rollers carried by said guide which rollers are supported thereon for adjustment relatively to one another and relatively to the spindle, one series of rollers consisting of separate individual rollers mounted for individual adjustment along said guide and also angularly with respect to the same.

2. A coil winding machine including a winding spindle and a wire guide endwise movable along said spindle, two series of guide rollers carried by said guide which rollers are supported thereon for adjustment relatively to one another and relatively to the spindle, one series of rollers consisting of separate individual rollers mounted for individual adjustment along said guide and also angularly with respect to the same, and the other series of rollers consisting of a bar having axially spaced peripheral grooves therein, said bar being mounted in said guide in the manner for limited up and down angular adjustment with respect to its mounting.

3. A coil winding machine including a winding spindle and a wire guide endwise movable along said spindles, said guide supporting a bar having axially spaced peripheral grooves therein for guiding wire strands to the spindle.

4. A coil winding machine including a winding spindle and a wire guide endwise movable along said spindle, a series of individual rollers mounted on said guide for individual adjustment along said guide and also for individual angular adjustment one with respect to another, another series of guide members fixed as to endwise adjustment and adjustable angularly as a unit about the mounting thereof in said guide.

5. A coil winding machine including a winding spindle and a wire guide endwise movable along said spindle, said guide including spaced end plates joined by a pair of rods, said rods being axially movably supported in the machine, a plurality of individual rollers carried by one of said rods, and roller guide elements carried by said plates, said rollers and said roller guide elements having the wires reversely trained thereabout as the same pass to the spindle.

6. A coil winding machine including, a winding spindle and a plurality of wire reels, tension means between the reels and the spindle, said tension means including a rotatable bar about which the wire strands are given a turn and then led to the spindle, said rod rotating as said spindle winds the strands thereon, and means for retarding the rotation of said rod to tension said wire.

7. A coil winding machine including; a winding spindle and a plurality of wire reels, tension means between the reels and the spindle, said tension means including a rotatable bar about which the wire strands are given a turn and then led to the spindle, said rod rotating as said spindle winds the strands thereon, and means for retarding the rotation of said rod to tension said wire, said retarding means being adjustable to vary the retarding effect imparted to said rod.

8. A coil winding machine including, a winding spindle and a plurality of wire reels, tension means between said reels and said spindle, said tension means including a rotatable bar about which the wire strands are given a turn and then led to the spindle, said rod rotating as said spindle winds the strands thereon, a lever bearing against said bar, and a weight slidable along said lever to retard the rotation of said bar during wire winding.

In testimony whereof, we have hereunto subscribed our names at Chicago, Cook County, Illinois.

WILMER J. LEIDY.
NICK KNUTH.